(12) United States Patent
Matsumoto et al.

(10) Patent No.: US 7,297,196 B2
(45) Date of Patent: *Nov. 20, 2007

(54) ANTHRAPYRIDONE COMPOUND, WATER-BASED MAGENTA INK COMPOSITION AND INKJET RECORDING METHOD

(75) Inventors: Hiroyuki Matsumoto, Saitama (JP); Katsunori Fujii, Kawaguchi (JP); Yasuo Shirasaki, Saitama (JP); Takafumi Fujii, Saitama (JP); Yasuo Murakami, Kawaguchi (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/556,740

(22) PCT Filed: May 20, 2004

(86) PCT No.: PCT/JP2004/007208

§ 371 (c)(1),
(2), (4) Date: Nov. 14, 2005

(87) PCT Pub. No.: WO2004/104108

PCT Pub. Date: Dec. 2, 2004

(65) Prior Publication Data

US 2007/0062413 A1 Mar. 22, 2007

(30) Foreign Application Priority Data

May 22, 2003 (JP) ............................. 2003-144312

(51) Int. Cl.
*C09D 11/00* (2006.01)
*C09D 11/02* (2006.01)
*C07D 221/18* (2006.01)
*B41J 2/01* (2006.01)

(52) U.S. Cl. ...................... 106/31.47; 546/76; 347/100
(58) Field of Classification Search ............. 106/31.47; 544/112, 188, 198, 209; 546/76; 347/100
See application file for complete search history.

(56) References Cited

U.S. PATENT DOCUMENTS 4,975,094 A * 12/1990 Miki et al. ..................... 8/537
6,152,969 A * 11/2000 Matsumoto et al. ............ 8/658
6,471,760 B1 10/2002 Matsumoto et al. ...... 106/31.47
6,645,283 B1 * 11/2003 Matsumoto et al. ...... 106/31.47
6,852,154 B2 2/2005 Kitamura et al. ........ 106/31.47
6,929,361 B2 8/2005 Matsumoto et al. ........ 347/100
2006/0103706 A1 * 5/2006 Aikawa et al. ............. 347/100
2006/0109324 A1 * 5/2006 Fujimoto et al. ........... 347/100
2006/0139428 A1 * 6/2006 Osumi et al. ............... 347/100
2006/0219131 A1 * 10/2006 Matsumoto et al. ...... 106/31.47

FOREIGN PATENT DOCUMENTS

| EP | 1 123 932 | 8/2001 |
| JP | 2004-2814 | 1/2004 |
| JP | 2004-091632 | 3/2004 |
| WO | 99/48981 | 9/1999 |
| WO | 03/027185 | 4/2003 |

OTHER PUBLICATIONS

The International Search Report dated Jun. 29, 2004.
The European Search Report dated Jun. 26, 2006.

* cited by examiner

*Primary Examiner*—Helene Klemanski
(74) *Attorney, Agent, or Firm*—Nields & Lemack

(57) ABSTRACT

The present invention provides magenta dyestuff represented by the formula (1):

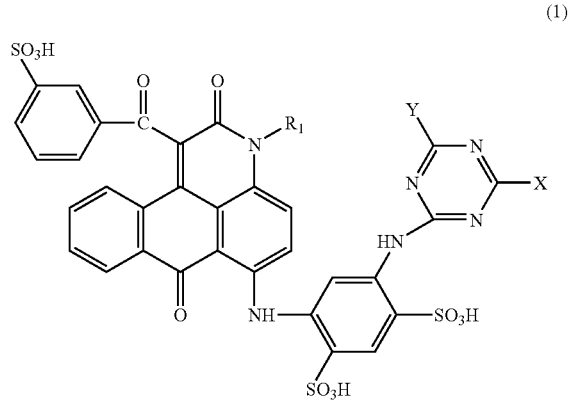

(wherein symbols are as defined in the present description), with hue and vividness suitable to ink-jet recording, records excellent in fastness to light, gas, water and so on and a superior ink composition using said dyestuff.

23 Claims, No Drawings

ANTHRAPYRIDONE COMPOUND, WATER-BASED MAGENTA INK COMPOSITION AND INKJET RECORDING METHOD

TECHNICAL FIELD

The present invention relates to a novel anthrapyridone compound, a water-based magenta ink composition and an ink-jet recording method.

BACKGROUND ART

Diverse ink jetting processes have been developed for the recording method by means of an ink-jet printer, and any process comprises generating ink droplets to deposit onto various recording materials (such as paper, film, cloth) for recording. The recording method by means of ink-jet printer has rapidly been spread in recent years and will be propagated in future because the method brings about no mechanical noise due to the system in which a recording head does not contact with the recording material and because the method advantageously allows the printer to become downsized, to work in a high-speed and to give color printing, easily. For recording an image information or a character information pictured on a computer color display in color by means of an ink-jet printer, the information is generally printed according to subtractive color mixing of inks of four colors, namely yellow (Y), magenta (M), cyan (C) and black (K). In order to print reproducibly an image pictured by additive color mixing of red (R), green (G) and blue (B) on a CRT display as faithfully as possible according to subtractive color mixing, the dyestuffs to use, especially ones for a Y, M or C ink, are desired to have color hues close to the respective standards of Y, M and C and vividness. Additionally, it is required that the resulting ink composition is stable for long-term storage and that the resulting printed image is of a high optical density and has excellent fastness including water fastness, light fastness, gas fastness and so on.

Ink-jet printers are increasingly used in a wide range from a small one for OA use to a big one for industrial use. So, excellence in fastness such as water fastness and light fastness of the printed image is more strictly demanded. The water fastness is substantially improved by coating inorganic micro particles such as porous silica, a cationic polymer, alumina sol or special ceramics which can absorb dyestuff from ink, on a paper sheet together with PVA resin. Further improvement in quality such as moisture fastness is desired in order to store the printed matter such as photos in good condition. However, light fastness is not yet improved by any established technique. Among tetrachromatic colors of Y, M, C and K, magenta especially has many dyestuffs which are naturally weak in light fastness, and the improvement is an important problem to be solved.

The typical types in chemical structure of magenta dyestuffs used in a water-soluble ink for ink-jet recording are a xanthene type and an azo type using the H acid. The xanthene type is indeed excellent in hue and vividness, but is very inferior in light fastness. The azo type using the H acid is good in hue and water fastness, but is inferior in light fastness and vividness. Some magenta dyestuffs in this type being excellent in vividness and light fastness have been developed, but are still inferior in light fastness to dyestuffs of the other hue such as yellow dyestuffs and cyan dyestuffs represented by copper phthalocyanine type.

Recently, the digital camera having been in widespread use, the chance to print out photos at home is increasing. However, there is a problem of color change in photos by the oxidizing gas in the air during storage.

Alternatively, for a chemical structure of magenta dyes being excellent in vividness and light fastness, an anthrapyridone type is known (for example, see JP Laid-Open No. 74173/1984 (1 to 3 pages), JP Laid-Open No. 16171/1990 (1 and 5 to 7 pages), JP Laid-Open No. 109464/2000 (1 to 2 and 8 to 12 pages), JP Laid-Open No. 169776/2000 (1 to 2 and 6 to 9 pages), JP Laid-Open No. 191660/2000 (1 to 3 and 11 to 14 pages), JP Laid-Open No. 72884/2001 (1 to 2 and 8 to 11 pages), JP Laid-Open No. 139836/2001 (1 to 2 and 7 to 12 pages), but can not yet show any satisfactory properties in hue, vividness, light fastness, water fastness, gas fastness and dissolving stability.

An object of the present invention is to provide a magenta dye which has hue and vividness suitable for ink-jet recording and gives the recorded material with high fastness in light fastness, gas fastness and moisture fastness; and magenta dyestuff suitable therefor.

DISCLOSURE OF THE INVENTION

The present inventors made a diligent study to solve the above problem and, as a result, have completed the present invention. Namely, the present invention is as follows:

1. An anthrapyridone compound represented by the following formula (1):

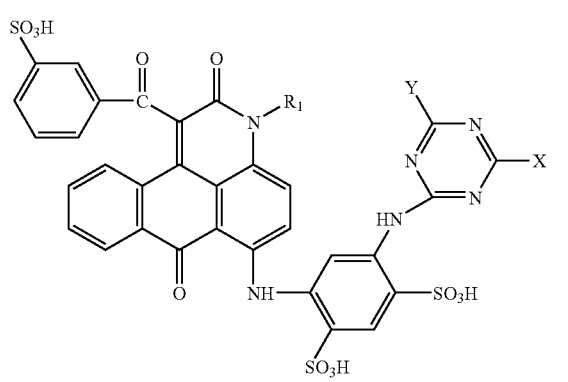

(1)

{wherein $R_1$ represents a hydrogen atom, an alkyl group, a hydroxy lower alkyl group, a cyclohexyl group, mono- or dialkylaminoalkyl group or a cyano lower alkyl group;

Y represents a chlorine atom, a hydroxyl group, an amino group, mono- or dialkylamino group (optionally substituted with a substituent selected from the group consisting of a sulfonic acid group, a carboxyl group and a hydroxyl group on an alkyl group), or a morpholino group;

X represents the following formula (2):

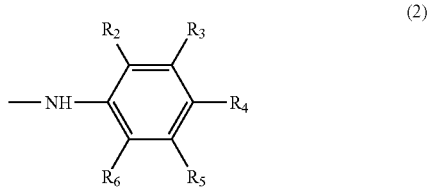

(wherein $R_2$, $R_3$, $R_4$, $R_5$ and $R_6$ each independently represent a hydrogen atom, a $C_{1-8}$ alkyl group or a carboxyl group, provided that such a case is excluded that all of $R_2$, $R_3$, $R_4$, $R_5$ and $R_6$ are hydrogen atoms)}, or the salt thereof.

2. The anthrapyridone compound or the salt thereof according to the above aspect 1, wherein $R_1$ in the formula (1) is a methyl group.

3. The anthrapyridone compound or the salt thereof according to the above aspect 1, wherein Y in the formula (1) is a hydroxyl group or an amino group.

4. The anthrapyridone compound or the salt thereof according to the above aspect 1, wherein $R_1$ in the formula (1) is a methyl group and Y is a hydroxyl group or an amino group.

5. The anthrapyridone compound or the salt thereof according to the above aspect 1, wherein one of or both of $R_2$ and $R_6$ among $R_2$ to $R_6$ are independently a group selected from the group consisting of a methyl group, an ethyl group, a n-propyl group, an iso-propyl group and a carboxyl group, and the remaining groups are hydrogen atoms.

6. The anthrapyridone compound or the salt thereof according to the above aspect 1, wherein 1 to 3 groups among $R_2$ to $R_6$ are carboxyl groups.

7. The anthrapyridone compound or the salt thereof according to the above aspect 1, wherein at least one of $R_2$, $R_3$ or $R_5$ is a carboxyl group and the remaining groups are hydrogen atoms.

8. The anthrapyridone compound or the salt thereof according to the above aspect 2, wherein 1 to 3 groups among $R_2$ to $R_6$ are carboxyl groups.

9. The anthrapyridone compound or the salt thereof according to the above aspect 4, wherein 1 to 3 groups among $R_2$ to $R_6$ are carboxyl groups.

10. The anthrapyridone compound or the salt thereof according to any one of the above aspects 1 to 9, wherein Y in the formula (1) is a hydroxyl group.

11. The anthrapyridone compound or the salt thereof according to the above aspect 1, wherein $R_1$ is a methyl group, Y is a hydroxyl group, 1 or 2 of $R_2$, $R_3$ or $R_5$ among $R_2$ to $R_6$ are carboxyl groups and the remaining groups are hydrogen atoms.

12. A water-based magenta ink composition characterized by comprising an anthrapyridone compound or the salt thereof according to any one of the above aspects 1 to 11 as dyestuff.

13. The water-based magenta ink composition according to the above aspect 12, wherein the composition contains a water-soluble organic solvent.

14. The water-based magenta ink composition according to the above aspect 12, wherein the content of an inorganic salt in the anthrapyridone compound or the salt thereof is 1% by weight or less.

15. The water-based magenta ink composition according to the above aspect 14, wherein the composition contains a water-soluble organic solvent.

16. The water-based magenta ink composition according to the above aspect 12, which is prepared for ink-jet recording.

17. The water-based magenta ink composition according to the above aspect 15, which is prepared for ink-jet recording.

18. A method for ink-jet recording, wherein ink droplets are ejected responding to the record signals to record onto a recording material, characterized by using the water-based magenta ink composition according to the above aspect 12 as an ink.

19. A method for ink-jet recording wherein ink droplets are ejected responding to the record signals to record onto a recording material, characterized by using the water-based magenta ink composition according to the above aspect 15 as an ink.

20. The method for ink-jet recording according to the above aspect 18 or 19, wherein the recording material is an information transmission sheet.

21. A container containing the water-based magenta ink composition according to the above aspect 12.

22. An ink-jet printer having the container according to the above aspect 21.

23. A colored article comprising the anthrapyridone compound or the salt thereof according to any one of the above aspects 1 to 11.

BEST MODE FOR CARRYING OUT THE INVENTION

The present invention is explained in more detail. The anthrapyridone compound or the salt thereof of the present invention is represented by the above formula (1).

In the formula (1), $R_1$ represents a hydrogen atom, an alkyl group, a hydroxy lower alkyl group, a cyclohexyl group, mono- or dialkylaminoalkyl group or a cyano lower alkyl group.

The alkyl group in the present invention includes, for example, a $C_{1-8}$ alkyl group such as a methyl group, an ethyl group, a n-propyl group, an iso-propyl group, a n-butyl group, a tert-butyl group, a n-hexyl group and a n-octyl group.

As the lower alkyl group in the present invention, such one as having 1 to 6 carbon atoms, preferably 1 to 4 carbon atoms, among the above-described alkyl groups is included and more preferably, a methyl group, an ethyl group or a propyl group is included. This is similarly applied to the term "lower" in, for example, lower alcohols other than a lower alkyl group in the present invention.

As a preferable lower alkyl group in a hydroxy lower alkyl group and a cyano lower alkyl group in $R_1$, for example, an ethyl group or a propyl group is included and an ethyl group is more preferable.

Preferable $R_1$ includes a lower alkyl group and a methyl group is more preferable.

In the formula (1), Y represents a chlorine atom, a hydroxyl group, an amino group, mono- or dialkylamino group (which optionally has a substituent selected from the group consisting of a sulfonic acid group, a carboxyl group and a hydroxyl group on the alkyl group), or a morpholino group. As the monoalkylamino group in Y, for example, a $C_{1-8}$ monoalkylamino group such as a methylamino group, an ethylamino group, a butylamino group and a 2-ethylhexylamino group is included. As the dialkylamino group, for example, a $C_{1-8}$ dialkylamino group such as a diethylamino group, a dibutylamino group and a dihexylamino group is included. As an alkyl group in the alkylamino group having a sulfonic acid group or a carboxyl group, for example, a $C_{1-8}$ alkyl group such as a methyl group, an ethyl group, a n-propyl group, and a n-butyl group is included. As a typical example of the alkylamino group having a sulfonic acid group or a carboxyl group, for example, a 2-sulfoethylamino group, a carboxymethylamino group, a 2-carboxyethylamino group, a 1-carboxyethylamino group, a 1,2-dicarboxyethylamino group or a di(carboxymethyl)amino group are included, and as a typical example of the alkylamino group having a hydroxyl group, for example, a hydroxyethylamino group and a dihydroxyethylamino group are included.

As a preferable Y, a hydroxyl group or an amino group is included and a hydroxyl group is more preferable.

X in the formula (1) represents a substituted anilino group represented by the formula (2).

$R_2$, $R_3$, $R_4$, $R_5$ and $R_6$ in the formula (2) each independently represent a hydrogen atom, a $C_{1-8}$ alkyl group or a carboxyl group, and at least one of them represents a group other than a hydrogen atom. As the $C_{1-8}$ alkyl group, for example, a $C_{1-8}$ alkyl group such as a methyl group, an ethyl group, a n-propyl group, an iso-propyl group, a n-butyl group, a tert-butyl group, a n-hexyl group and a n-octyl group are included. As for the alkyl group, in view of hue, it is preferable that $R_2$ and/or $R_6$ are alkyl groups and the others are hydrogen atoms. As said alkyl group, a methyl group, an ethyl group, a n-propyl group or an iso-propyl group is preferable.

As $R_2$ to $R_6$, a lower alkyl group or a carboxyl group is preferable, and it is preferable that 1 to 3 groups, more preferably 1 to 2 groups among $R_2$ to $R_6$ are these groups and the others are hydrogen atoms. When two groups among them are other than hydrogen atoms, such a case is preferable that $R_2$ and $R_6$ or $R_3$ and $R_5$ are groups other than hydrogen atoms, while when three groups among them are other than hydrogen atoms, such a case is preferable that $R_2$, $R_4$ and $R_6$ are groups other than hydrogen atoms. A more preferable case is that 1 to 3 groups among $R_2$ to $R_6$ are carboxyl groups and the others are hydrogen atoms. A still more preferable case is that at least one of $R_2$, $R_3$ or $R_5$ is a carboxyl group.

A typical example of X in the formula (1) includes, for example, a 2-methylanilino group, a 2,6-dimethylanilino group, a 2,5-dimethylanilino group, a 2,4,6-trimethylanilino group, a 2,6-diethylanilino group, a 2,5-diethylanilino group, a 2,6-di-iso-propylanilino group, a 2,5-di-iso-propylanilino group, a 2-carboxyanilino group, a 3-carboxyanilino group, a 4-carboxyanilino group, a 2,5-dicarboxyanilino group, a 3,5-dicarboxyanilino group, a 5-carboxy-2-methylanilino group and a 5-carboxy-2-ethylanilino group, and a 2,6-dimethylanilino group, a 2,4,6-trimethylanilino group, a 2,6-diethylanilino group, a 2,6-di-iso-propylanilino group, a 2-carboxyanilino group and a 3,5-dicarboxyanilino group are preferable.

A preferable combination of $R_1$, Y and X includes, for example, $R_1$ is a hydrogen atom or a methyl group, more preferably a methyl group; Y is a chlorine atom, a hydroxyl group or an amino group, more preferably a hydroxyl group or an amino group and further preferably a hydroxyl group; and X is a 2,6-dimethylanilino group, a 2,6-diethylanilino group, a 2,6-di-iso-propylanilino group, a 2-carboxyanilino group or a 3,5-dicarboxyanilino group, more preferably a 2-carboxyanilino group or 3,5-dicarboxyanilino group.

Typical examples of the anthrapyridone compounds represented by the above formula (1) of the present invention are listed in Table 1. In Table 1, (K) and 2(K) mean a carboxyl group and a dicarboxyl group, respectively.

TABLE 1

| No. | $R_1$ | X | Y |
|---|---|---|---|
| 1 | CH3 | 2,6-dimethylanilino | OH |
| 2 | CH3 | 2,6-dimethylanilino | NH2 |
| 3 | CH3 | 2,5-dimethylanilino | OH |
| 4 | CH3 | 2-methylanilino | OH |
| 5 | CH3 | 2,4,6-trimethylanilino | OH |
| 6 | CH3 | 2,4,6-trimethylanilino | NH2 |
| 7 | H | 2,4,6-trimethylanilino | Cl |
| 8 | CH3 | 2,4,6-trimethylanilino | 2-ethylhexylamino |
| 9 | CH3 | 2,6-diisopropylanilino | OH |
| 10 | CH3 | 2,6-diisopropylanilino | NH2 |
| 11 | C2H5 | 2,6-diisopropylanilino | Cl |
| 12 | CH3 | 2,6-diisopropylanilino | monoethanolamino |
| 13 | CH3 | 2,5-diisopropylanilino | OH |
| 14 | CH3 | 2,6-diethylanilino | OH |
| 15 | CH3 | 2,6-diethylanilino | NH2 |
| 16 | CH3 | 2,6-diethylanilino | Cl |
| 17 | CH3 | 2,6-diethylanilino | 2-ethylhexylamino |
| 18 | CH3 | 2,6-diethylanilino | monoethanolamino |
| 19 | CH3 | 2,6-diethylanilino | diethanolamino |
| 20 | C2H4OH | 2,6-diethylanilino | morpholino |
| 21 | CH3 | 2,5-diethylanilino | OH |
| 22 | CH3 | 2,5-diethylanilino | NH2 |
| 23 | CH3 | 2-(K)-anilino | OH |
| 24 | CH3 | 2-(K)-anilino | NH2 |
| 25 | CH3 | 2,5-2(K)-anilino | OH |
| 26 | C4H9 | 2,5-2(K)-anilino | NH2 |
| 27 | CH3 | 3,5-2(K)-anilino | OH |
| 28 | CH3 | 3-(K)-anilino | OH |
| 29 | CH3 | 4-(K)-anilino | OH |
| 30 | CH3 | 5-(K)-2-methylanilino | OH |
| 31 | CH3 | 5-(K)-2-ethylanilino | OH |
| 32 | CH3 | 2,5-diisopropylanilino | Cl |
| 33 | CH3 | 2,4,6-trimethylanilino | Cl |
| 34 | CH3 | 2-(K)-anilino | Cl |
| 35 | CH3 | 3,5-2(K)-anilino | Cl |
| 36 | CH3 | 4-(K)-anilino | Cl |
| 37 | CH3 | 3-(K)-anilino | Cl |

The anthrapyridone compound of the present invention is produced, for example, by the following methods: That is, 1 mole of the compound of the following formula (3):

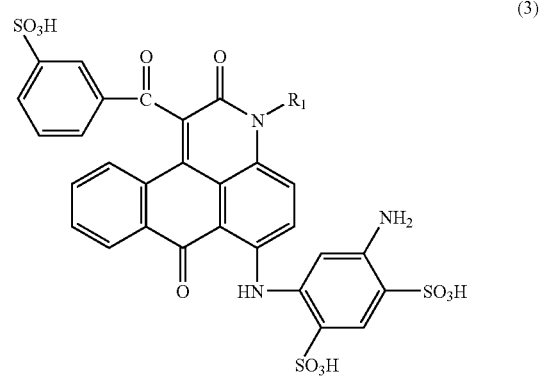

wherein $R_1$ represents the same meaning as the above) is reacted with 1 to 1.3 moles of 2,4,6-trichloro-S-triazine (cyanuric chloride) in water at pH of 2 to 7, at 5 to 35° C. for 2 to 8 hours to obtain the first condensate represented by the formula (4):

(4)

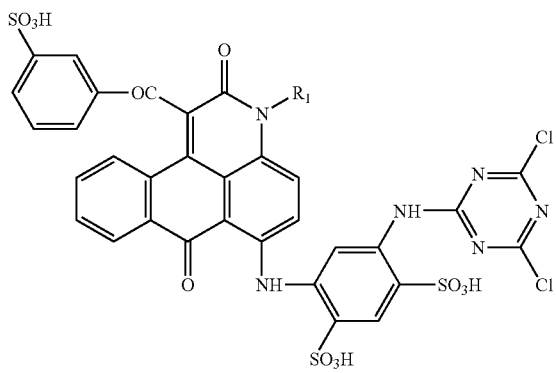

(wherein R₁ represent the same meaning as the above), and this compound is subsequently reacted with 1 mole of corresponding anilines at pH of 4 to 9, at 5 to 90° C. for 10 minutes to 5 hours to obtain the compound represented by the formula (5), wherein Y represents a chlorine atom, as the second condensate:

(5)

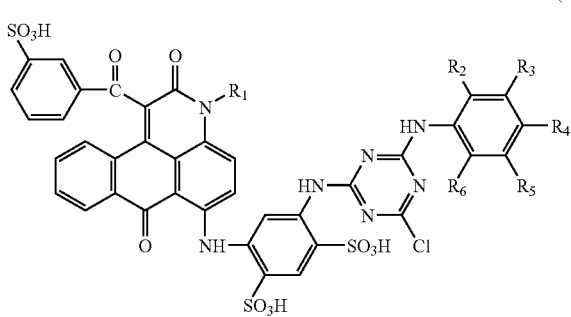

(wherein R₁ to R₆ represent the same meaning as the above)

Subsequently, this condensate is subjected to hydrolysis at pH of 9 to 12, at 50 to 100° C. for 10 minutes to 5 hours or reaction with ammonia or corresponding amines at pH of 8 to 10, at 50 to 100° C. for 10 minutes to 8 hours to obtain the compound represented by the formula (6), wherein Y is other than a chlorine atom, as the third condensate:

(6)

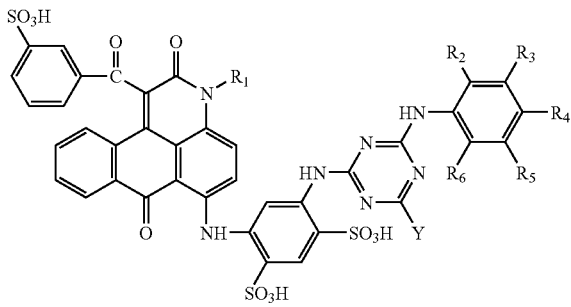

(wherein R₁ to R₆ and Y represent the same meaning as the above)

In the above procedure, the order of condensation reactions may be determined as appropriate depending on reactivities of various compounds and not limited to the above.

The compound thus obtained above is present in free acid form or a salt form thereof.

As the salt, for example, an alkali metal salt, an alkaline earth metal salt, an alkylamine salt, an alkanolamine salt or an ammonium salt are included. Preferably, included are an alkali metal salt such as a sodium salt, a potassium salt and a lithium salt; an alkanolamine salt such as a monoethanolamine salt, a diethanolamine salt, a triethanolamine salt, a mono-iso-proanolamine salt, a di-iso-propanolamine salt, a tri-iso-propanolamine salt; and an ammonium salt. As for a production method for the salt, for example, by adding sodium chloride to a reaction solution of the third condensate obtained above, followed by salting out and filtering, a sodium salt is obtained as a wet cake, which is then subjected to dissolution again in water and subsequently by adjusting the pH at 1 to 2 by the addition of HCl to obtain crystal and by filtering the crystal obtained, a free acid form (or partially a sodium salt form as it is) is obtained. Further, under stirring of this wet cake in free acid form with water, by making the solution alkaline with the addition of, for example, potassium hydroxide, lithium hydroxide or ammonium water, a sodium salt, a lithium salt or an ammonium salt can be obtained, respectively.

In addition to the above, the anthrapyridone compound of the formula (3) is obtained, for example, by the following methods: That is, 1 mole of the anthrapyridone compound of the following formula (7):

(7)

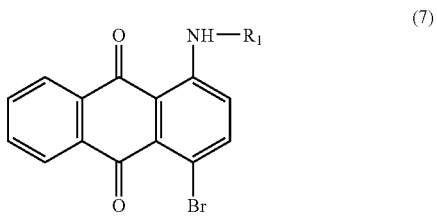

(wherein R₁ represents the same meaning as the above) is reacted with 1.1 to 3 moles of ethyl benzoylacetate in a polar solvent such as xylene in the presence of a basic compound such as sodium carbonate at 130 to 180° C. for 5 to 15 hours to obtain the compound of the following formula (8):

(8)

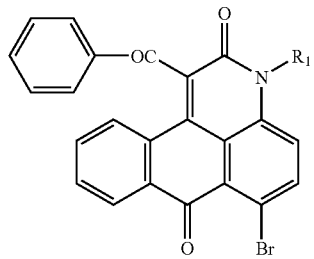

(wherein R₁ represents the same meaning as the above).

Subsequently, 1 mole of the compound of the formula (8) is subjected to condensation by Ulmann reaction with 1 to 5 moles of m-aminoacetanilide in an aprotic polar organic solvent such as N,N-dimethyl formamide in the presence of a basic compound such as sodium carbonate and a copper catalyst such as copper acetate at 110 to 150° C. for 2 to 6 hours to obtain the compound of the following formula (9):

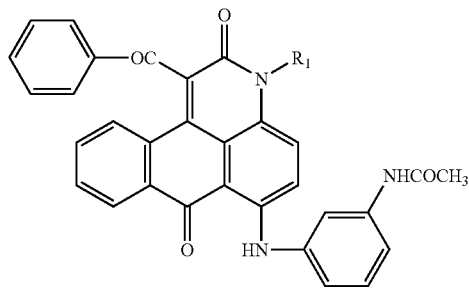

(9)

(wherein R₁ represents the same meaning as the above).

Subsequently by sulfonation and hydrolysis of the acetylamino group of the compound of the formula (9) in 8 to 15% of fumed sulfuric acid at 50 to 120° C., the anthrapyridone compound of the general formula (3):

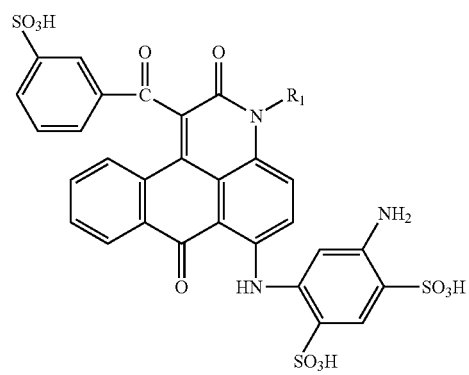

(3)

(wherein R₁ represents the same meaning as the above) can be obtained.

The anthrapyridone compound of the formula (1) and the salt thereof of the present invention can be used as dyestuff for coloring various materials, and is preferable, in particular, as dyestuff for ink. When it is used for ink, it is preferable that said compound is a water-soluble salt.

The water-based magenta ink composition of the present invention (hereinafter it may sometimes be referred to as simply "ink") contains the compound of the above formula (1) and a salt thereof (hereinafter the compound of the formula (1) and a salt thereof may sometimes be referred to as "dyestuff of the formula (1)") as a dyestuff component and said composition can be obtained by dissolving said dyestuff into water or, if necessary, water containing a water-soluble organic solvent (which includes a dissolution co-agent; the same hereinafter) (hereinafter it may sometimes be referred to as a water-based solvent). Said ink preferably has pH of 6 to 11.

When this water-based ink is used in printer for ink-jet recording, a dyestuff component with lower content of an inorganic substance such as chloride and sulfate of a metal cation is preferable, and rough standard of the total content of sodium chloride and sodium sulfate is 1% by weight or lower. To produce the dyestuff component of the present invention having lower inorganic substance, a method for desalting can be repeated in needed times, for example, an ordinary method by a reverse osmosis membrane or a method for subjecting a dried dyestuff component or a wet cake of the dyestuff component of the present invention to stirring in a mixed solvent of an methanol and water, filtering and drying.

In an ink-jet printer, aiming at providing highly fine image, there are a cyan ink and a magenta ink set with two kinds of inks, that is, a high concentration ink and a low concentration ink. In this case, a high concentration ink containing dyestuff of the formula (1) of the present invention and a low concentration ink containing dyestuff of the formula (1) of the present invention can be used in combination as the ink set. Further, dyestuff of the above formula (1) satisfying the above conditions can be used in combination with known magenta dyestuff.

The ink of the present invention is prepared using water as a medium. The ink of the present invention contains usually 0.3 to 8% by mass of the dyestuff of the above formula (1). The remaining is water, and if necessary, a water-soluble organic solvent and other ink regulators to be mixed. The components to be mixed if necessary are contained within the content range not impairing the effect of the present invention. The water-soluble organic solvent is used as a dye-dissolving agent, an agent for prohibiting dryness (a wetting agent), a viscosity modifier, a penetration promoter, a surface tension modifier, an antifoaming agent, and the like. Other ink regulators include known additives such as an antiseptics-fungicide, a pH adjusting agent, a chelating agent, a rust preventive, an ultraviolet absorbing agent, a viscosity modifier, a dye-dissolving agent, a fading inhibitor, an emulsion stabilizer, a surface tension modifier, an antifoaming agent, a dispersing agent and a dispersion stabilizer. Content of the water-soluble organic solvent is 0 to 60% by mass, preferably 10 to 50% by mass based on the total amount of an ink and the other ink regulators are preferably used in 0 to 20% by mass, preferably 0 to 15% by mass.

The above water-soluble organic solvent includes, for example, $C_{1-4}$ alkanols such as methanol, ethanol, n-propanol, isopropanol, n-butanol, isobutanol, sec-butanol and tert-butanol; carboxamides such as N,N-dimethyl formamide and N,N-dimethyl acetamid, preferably a lower alkylamide of a lower aliphatic carboxylic acid; heterocyclic ketones such as 2-pyrrolidone, N-methyl-2-pyrrolidone, 1,3-dimethylmidazolidin-2-one or 1,3-dimethylhexahydropyrimidine-2-one, preferably a 5 to 6 membered cyclic ketone containing a nitrogen atom; ketones or keto-alcohols such as acetone, methyl ethyl ketone and 2-methyl-2-hydroxypentane-4-one, preferably a $C_{1-8}$ aliphatic ketone or ketoalcohol; cyclic ethers such as tetrahydrofuran and dioxane, preferably a $C_{1-8}$ cyclic ether; monomers or oligomers having a $(C_{2-6})$ alkylene unit or poly$(C_{2-6})$alkylene glycols or thioglycols such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol and polypropylene glycol; polyol(triol) such as glycerine and hexane-1,2,6-triol, preferably a $C_{3-8}$ aliphatic triol; $(C_{1-4})$ alkyl ethers of lower polyhydric alcohols such as ethylene glycol monomethyl ether or ethylene glycol monoethyl ether, or diethylene glycol monomethyl ether or diethylene glycol monoethyl ether, or triethylene glycol monomethyl ether or triethylene glycol monoethyl ether; γ-butyrolactone or dimethylsulfoxide.

Preferable one among them includes isopropanol, glycerine, mono, di- or triethylene glycol, dipropylene glycol, 2-pyrrolidone and N-methyl-2-pyrrolidone, and isopropanol, glycerine, diethylene glycol and 2-pyrrolidone are more preferable. These water-soluble organic solvents are used alone or by mixing thereof.

As antiseptics-fungicide includes an organosulfur type, an organonitrogen sulfur type, an organohalogen type, a haloarylsulfone type, an iodopropargyl type, an N-haloalkylthio type, a nitrile type, a pyridine type, an 8-oxyquinoline type, a benzothiazole type, an isothiazoline type, a dithiol type, a pyridine oxide type, a nitropropane type, an organotin type, a phenol type, a quaternary ammonium salt type, a triazine type, a thiadiazine type, an anilide type, an adamantane type, a dithiocarbamate type, a brominated indanone type, a benzylbromacetate type, an inorganic salt type, etc. The organohalogen type compound includes, for example, sodium pentachlorophenolate, and the pyridine oxide type compound includes, for example, 2-pyridinethiol-1-oxide sodium salt, and the inorganic salt type compound includes, for example, anhydrous sodium acetate, and the isothiazoline type compound includes, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride and 2-methyl-4-isothiazoline-3-one calcium chloride. Other antiseptics-fungicide includes sodium sorbate, sodium benzoate, and the like (for example, Proxcel GXL(S) (trade name) and Proxcel XL-2(S) (trade name), and the like manufactured by Avecia KK).

As for the pH adjusting agent, any substance can be used as far as it can control the pH of an ink within the range at 6.0 to 11.0 to improve storage stability of an ink. For example, lower alkanolamines such as diethanolamine and triethanolamine; alkali metal hydroxides such as lithium hydroxide, sodium hydroxide and potassium hydroxide; ammonium hydroxide; and alkali metal carbonates such as lithium carbonate, sodium carbonate and potassium carbonate are included.

As the chelating agent, for example, an ethylendiaminetetraacetic acid tetrasodium salt, a nitrilotriacetic acid trisodium salt, a hydroxyethylethylenediamine triacetic acid trisodium salt, a diethylenetriamine pentaacetic acid pentasodium salt and a uramildiacetic acid disodium salt are included. The rust preventive includes, for example, an acidic sulfite, sodium thiosulfate, ammonium thioglycolate, diisopropylammonium nitrite, pentaerithritol tetranitrate, dicyclohexylammonium nitrite, etc.

As the ultraviolet absorbing agent, for example, a benzophenone type compound, a benzotriazole type compound, a cinnamic acid type compound, a triazine type compound, a stilbene type compound, or a compound which emits fluorescence by absorbing ultraviolet rays, represented by a benzoxazole type compound, a so-called fluorescent whitening agent can also be used.

As the viscosity modifier, a water soluble polymer compound is exemplified, for example, polyvinyl alcohol, cellulose derivatives, polyamine, polyimine, and the like, besides a water soluble organic solvent.

As the dye-dissolving agent, for example, urea, e-caprolactam, ethylene carbonate, and the like are included.

The fading inhibitor is used to improve image storage ability. As the fading inhibitor, various kinds of an organic-based or a metal complex-based fading inhibitor can be used.

As the organic fading inhibitor, for example, hydroquinones, alkoxyphenols, dialkoxyphenols, phenols, anilines, amines, indanes, chromans, alkoxyanilines, heterocycles, and the like are included. As the metal complex, a nickel complex, a zinc complex, and the like are included.

As the surface tension modifier, surfactants such as an anionic surfactant, an amphoteric surfactant, a cationic surfactant and a nonionic surfactant are included. As the anionic surfactant, salts such as alkylsulfocarboxylate, a-olefinsulfonate, polyoxyethylenealkylether acetate, N-acylamino acids and salts thereof, N-acylmethyltaurine salts, alkylsulfate polyoxyalkylethersulfate, alkylsulfate polyoxyethylenealkyletherphosphate, rosin acid soap, castor oil sulfate, lauryl alcohol sulfate, alkylphenol phosphate, alkyl phosphate, alkylaryl sulfonate, diethyl sulfosuccinate, diethylhexyl sulfosuccinate and dioctyl sulfosuccinate are included. As the cationic surfactant, 2-vinylpyridine derivatives and poly (4-vinylpyridine) derivatives are included. As the amphoteric surfactant, lauryldimethylaminoacetic acid betaine, 2-alkyl-N-carboxymethyl-N-hydroxyethyl imidazolinium betaine, palm oil fatty acid amide propyl dimethylamino acetic acid betaine, polyoctylpolyaminoethyl glycine and other imidazoline derivatives are included. As the nonionic surfactant ethers, such as polyoxyethylene nonylphenyl ether, polyoxyethylene octylphenyl ether, polyoxyethylene dodecylphenyl ether, polyoxyethylene octylphenyl ether, polyoxyethylene oleyl ether, polyoxyethylene lauryl ether, polyoxyethylene alkyl ethers and polyoxy arylkyl alkyl ether; polyoxyethylene oleic acid; esters such as polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; acetylene glycols such as 2,4,7,9-tetramethyl-5-decyn-4,7-diol, 3,6-dimethyl-4-octyn-3,6-diol and 3,5-dimethyl-1-hexyn-3-ol (for example, Surfinol-104E, -104PG50, -82, -465, Olfin-STG, manufactured by Nissin Chemical Industry Co., Ltd.) are included.

These ink regulators are used alone or by mixing thereof. In this connection, surface tension of an ink according to the present invention is usually 25 to 70 mN/m, preferably 25 to 60 mN/m. And viscosity of the ink according to the present invention is preferably 30 mPa·s or lower. Further, it is more preferable to adjust it to 20 mPa·s or lower.

The water-based ink composition of the present invention can be obtained by mixing and stirring each of the above components in arbitrary order. The ink composition obtained may be subjected to filtration with a membrane filter, and the like to remove foreign matters.

Recording materials in the ink-jet recording method of the present invention are not especially limited as long as they are recordable materials by ink-jetting. For example, an information transmitting sheet such as a paper and a film, fiber and leather are included. It is preferable that the information transmission sheet is a surface-treated one, typically an ink receiving layer is set on these substrates. The ink receiving layer can be set by, for example, impregnation or coating a cationic polymer onto the above substrate or coating inorganic fine particles which can adsorb dyestuff in ink such as porous silica, alumina sol or special ceramics, along with a hydrophilic polymer such as polyvinylalcohol or polyvinyl pyrrolidone onto the surface of the above substrate. These materials set with the ink receiving layer are generally called as an ink-jet paper (film), a glossy paper (film), and they are commercially sold, for example, as Pictoriko (trade name: manufactured by Asahi Glass Co. Ltd.), Color BJ Paper, Color BJ Photofilm Sheet (all of these are trade names: manufactured by Canon Inc.), Color Image Jet Paper (trade name: manufactured by Sharp Co., Ltd.), Super Fine Glossy Film (trade name: manufactured by Seiko Epson Co., Ltd.), PictaFine (tradename: manufactured by Hitachi Maxell, Ltd.), and the like. Naturally, plain papers without setting these ink receiving layers can also be utilized.

As for fibers, a cellulose fiber, or a polyamide fiber such as nylon, silk, wool, and the like are preferable and non-woven fabric or cloth-like fiber is preferable. By subjecting these fibers to a fastening process by wet heating (for example, at about 80 to 120° C.) or dry heating (for example, at about 150 to 180° C.), after furnishing the ink composition of the present invention to said fiber, preferably after furnishing by means of an ink-jet method, dyestuff can be fixed inside said fibers and thus dyed products superior in vividness, light fastness and washing fastness can be provided.

A container of the present invention contains the above water-based magenta ink composition. An ink-jet printer of the present invention is equipped with the container of the present invention containing the above water-based magenta ink composition at the ink tank part. Further, a colored article of the present invention is obtained by coloring a material to be colored by a usual method, for example, coating, printing, impregnation, and the like, by using the new anthrapyridone compound of the above formula (1) or the salt thereof, as it is or as a composition formulated with additives, if necessary, and is preferably one colored by the above water-based magenta ink composition.

The water-based ink composition of the present invention provides vivid printed surface as well as nearly ideal magenta color, and can provide a recorded article superior, in particular, ozone gas fastness, along with fastness to light, humidity and water. The composition, when used together with a yellow or cyan ink, can provide wide visible ray range of color tone and moreover, when used together with a conventional yellow, cyan, or black ink superior in fastness to ozone gas, light, humidity and water, can provide a recorded article superior in fastness to ozone gas, light, humidity and water.

EXAMPLES

The present invention will be described below in more details with reference to Examples. "Parts" and "%" in the description are shown by weight unless otherwise specified.

Example 1

(1) To 360 parts of xylene were added 94.8 parts of the compound of the formula (7) ($R_1$=$CH_3$), 3.0 parts of sodium carbonate and 144.0 parts of ethyl benzoylacetate successively under stirring, followed by raising the temperature. The reaction was carried out at 140 to 150% for 8 hours, and the formed ethanol and water during the reaction were removed by azeotropic distillation with xylene to complete the reaction. Successively, the reaction solution was cooled, to which 240 parts of methanol was added, stirred at 30° C. for 30 minutes, filtered, washed with 360 parts of methanol, and dried to obtain 124.8 parts of the compound of the formula (8) ($R_1$=$CH_3$) as pale yellow needle crystal.

(2) To 300.0 parts of N,N-dimethyl formamide were added 88.8 parts of the compound of the formula (8) ($R_1$=$CH_3$), 75.0 parts of m-aminoacetanilide, 24.0 parts of copper acetate monohydrate and 12.8 parts of sodium carbonate successively under stirring, followed by raising the temperature. The reaction was carried out at 120 to 130° C. for 3 hours. Successively the reaction solution was cooled to about 50%, to which 120 parts of methanol was added, stirred for 30 minutes, filtered, washed with 500 parts of methanol, successively washed with hot water of 80° C. and dried to obtain 79.2 parts of the compound of the formula (9) ($R_1$=$CH_3$) as bluish red crystal.

(3) Then, to 130 parts of 98.0% sulfuric acid was added 170.0 parts of 28.0% fuming sulfuric acid under stirring and water cooling to prepare 300 parts of 12% fuming sulfuric acid. The compound of the formula (9) ($R_1$=$CH_3$) of 51.3 parts was added under water cooling at 50 or below, followed by raising the temperature. The reaction was carried out at 85 to 90° C. for 4 hours. Consequently, into 600 parts of ice water was added the above obtained sulfonated solution keeping the reaction temperature at 50° C. or below by adding ice. Water was added to make the solution of 1000 parts, followed by filtering to remove insoluble matter. To the filtrate was added hot water to make the solution of 1500 parts, successively were added 300 parts of sodium chloride under stirring for 3 hours at 60 to 65° C., followed by filtering the precipitated crystal, which was washed with 300 parts of 20% aqueous solution of sodium chloride and squeezed well to obtain 100.3 parts of a wet cake containing 59.2 parts of the compound of the formula (3) ($R_1$=$CH_3$) (purity 45.9% by a diazo analysis method, the same hereinafter) as red crystal.

(4) Into 60 parts of water added 67.7 parts of the wet cake of the compound of the formula (3) ($R_1$=$CH_3$) (purity 45.9%) obtained in the above (3), and subsequently added 24 parts of 25% sodium hydroxide solution and stirred to dissolve while further adding 25% sodium hydroxide solution to adjust the pH at 3 to 4.

On the other hand, to 60 parts of ice water was added 0.4 parts of Lipal OH (trade name, an anionic surfactant by Lion KK) to dissolve. Cyanuric chloride of 8.9 parts was then added to the solution, followed by stirring for 30 min. The suspension solution obtained was added to a solution containing the compound of the above formula (3), and the first condensation reaction was carried out at 25 to 30° C. for 3 hours while adjusting the pH at 2.7 to 3.0 by dropping 10% aqueous sodium hydroxide solution, to obtain the reaction solution containing the compound of the formula (4) ($R_1$=$CH_3$).

(5) To the reaction solution of the above (4) containing the compound of the formula (4) ($R_1$=$CH_3$) was added 8.6 parts of 2,6-diethylaniline, further was added water to make the solution of 300 parts, followed by raising the temperature. The second condensation reaction was carried out at 60 to 70° C. for 1 hour while adjusting the pH at 6.0 to 6.5 by dropping 10% aqueous sodium hydroxide solution, to obtain the reaction solution containing the compound of No. 16 in Table 1 (the compound of the formula (1), wherein $R_1$=$CH_3$, X=2,6-diethylanilino group and Y=Cl).

(6) While adjusting the pH at 10.8 to 11.2 by addition of 25% aqueous sodium hydroxide solution to the reaction solution obtained in the above (5), reaction was carried out at 90 to 95° C. for 1 hour. After the reaction, water was added to adjust the reaction solution to 400 parts, and insoluble matter was removed by filtration.

To the reaction solution obtained was added ice water to make the solution of 700 parts. Temperature was maintained at 20 to 25° C., followed by the addition of 105 parts of sodium chloride and conc. HCl to adjust the pH at 1, stirring for 1 hour, filtering crystal, washing with 200 parts of 15% aqueous sodium chloride solution to obtain the compound of No. 21 in Table 1 (the compound of the formula (1), wherein $R_1$=$CH_3$, X=2,6-diethylanilino group and Y=OH) (the compound of the following formula (10)) as a red wet cake.

(7) The wet cake obtained in the above (6) was added in 200 parts of methanol, followed by heating to 60 to 65° C. and dissolving and stirring for 1 hour in ice water at about 5° C., and filtered the crystal precipitated, washed with methanol and dried to obtain 27.4 parts of the compound as dark red crystal.

λ max:543.0 nm (in water)

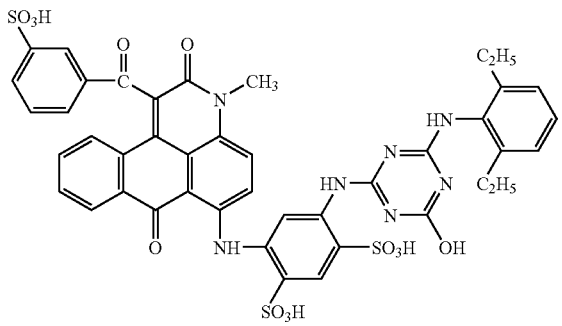

(10)

Example 2

(1) To the reaction solution containing the compound of the formula (4) ($R_1$=$CH_3$) obtained as in (1) to (4) of Example 1 was added 9.2 parts of 2,6-diisopropylaniline, further was added water to make the solution of 200 parts, followed by raising the temperature and the second condensation reaction was carried out at 70 to 75° C. for 1 hour while adjusting the pH at 6.0 to 6.5 by dropping 25% aqueous sodium hydroxide solution, to obtain the reaction solution containing the compound of No. 32 in Table 1 (the compound of the formula (1) wherein $R_1$=$CH_3$, X=2,6-diisopropylanilino group and Y=Cl).

(2) While adjusting the pH at 10.8 to 11.2 by addition of 25% aqueous sodium hydroxide solution to the reaction solution obtained in the above (1), reaction was carried out at 90 to 95° C. for 2 hours. After the reaction, water was added to adjust the reaction solution to 400 parts and insoluble matter was removed by filtration. Ice water was added to adjust the reaction solution to 500 parts and into which 75 parts of sodium chloride was added while maintaining at about 30° C., then HCl was added to adjust the pH at 0.5, followed by stirring for 30 minutes. Crystal obtained was filtered and washed with 200 parts of 20% aqueous solution of sodium chloride to obtain the compound of No. 9 in Table 1 (the compound of the formula (1) wherein $R_1$=$CH_3$, X=2,6-diisopropylanilino group and Y=OH) (the compound of the formula (11)) as a red wet cake.

(3) The wet cake obtained in the above (2) was added in 200 parts of methanol, followed by heating to 60 to 65%, dissolving, ice cooling to about 5° C. and stirring for 30 minutes. Crystal precipitated was filtered, washed with methanol, and dried to obtain 26.2 parts of the compound as dark red crystal.

λ max:542.8 nm (in water)

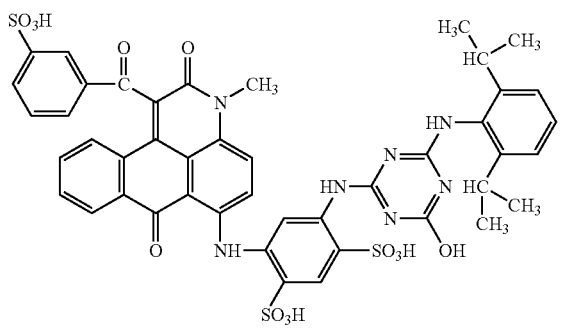

(11)

Example 3

(1) To the reaction solution containing the compound of the formula (4) ($R_1$=$CH_3$) obtained as in (1) to (4) of Example 1 was added 7.0 parts of 2,4,6-trimethylaniline (mesidine), further was added water to make the solution of 200 parts, followed by raising the temperature. The second condensation reaction was carried out at 60 to 65° C. for 30 minutes while adjusting the pH at 5.0 to 6.0 by dropping 10% aqueous sodium hydroxide solution, to obtain the reaction solution containing the compound of No. 33 in Table 1 (the compound of the formula (1) wherein $R_1$=$CH_3$, X=2,4,6-trimethylanilino group and Y=Cl).

(2) Temperature of the reaction solution was raised, and then reaction was carried out at 90 to 95° C. for 1 hour while adjusting the pH at 10.8 to 11.2, by addition of 25% aqueous sodium hydroxide solution. After the reaction, water was added to adjust the reaction solution to 400 parts and insoluble matter was removed by filtration. Water was added to adjust the reaction solution to 500 parts and into which 75 parts of sodium chloride was added while maintaining at 60 to 65%, then HCl was added to adjust the pH at 0.5, followed by stirring for 30 minutes. Crystal obtained was filtered and washed with 400 parts of 15% aqueous solution of sodium chloride to obtain the compound of No. 5 in Table 1 (the compound of the formula (1) wherein $R_1$=$CH_3$, X=2,4,6-trimethylanilino group and Y=OH) (the compound of the formula (12)) as a red wet cake.

(3) The wet cake obtained in the above (2) was added in 500 parts of methanol, followed by heating to 60-65° C., dissolving, ice cooling to about 5° C. and stirring for 30 minutes. Crystal precipitated was filtered, washed with methanol, and dried to obtain 28.0 parts of the compound as red crystal.

λ max:539.8 nm (in water)

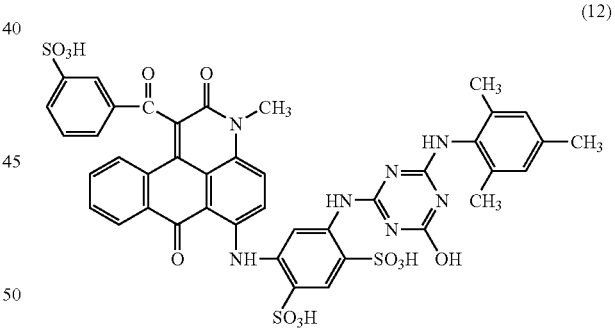

(12)

Example 4

(1) To the reaction solution containing the compound of the formula (4) ($R_1$=$CH_3$) obtained as in (1) to (4) of Example 1 was added 6.6 parts of anthranilic acid, further was added an aqueous solution consisting of 7.6 parts of 25% aqueous sodium hydroxide solution and 40 parts of water, and the second condensation reaction was carried out at 50 to 60° for 30 minutes while adjusting the pH at 5 to 6 by dropping 25% aqueous sodium hydroxide solution, to obtain the reaction solution containing the compound of No. 34 in Table 1 (the compound of the formula (1) wherein $R_1$=$CH_3$, X=2-carboxyanilino group and Y=Cl).

(2) While adjusting the pH at 10.3 to 10.7 by addition of 25% aqueous sodium hydroxide solution to the reaction solution obtained in the above (1), reaction was carried out at 80 to 90° C. for 30 minutes. After the reaction, water was added to adjust the reaction solution to 600 parts and insoluble matter was removed by filtration. Water was added to adjust the reaction solution to 800 parts and into which 120 parts of sodium chloride was added while maintaining at 60 to 65° C., then HCl was added to adjust the pH at 0.5, followed by stirring for 30 minutes. Crystal obtained was filtered and washed with 200 parts of 15% aqueous solution of sodium chloride to obtain the compound of No. 23 in Table 1 (the compound of the formula (1) wherein $R_1$=$CH_3$, X=2-carboxyanilino group and Y=OH) (the compound of the following formula (13)) as a red wet cake.

(3) The wet cake obtained in the above (2) was added in 800 parts of methanol, followed by heating to 60 to 65°, stirring, filtering, washing with methanol, and dried to obtain 30.4 parts of the compound as red crystal.

λ max:540.5 nm (in water)

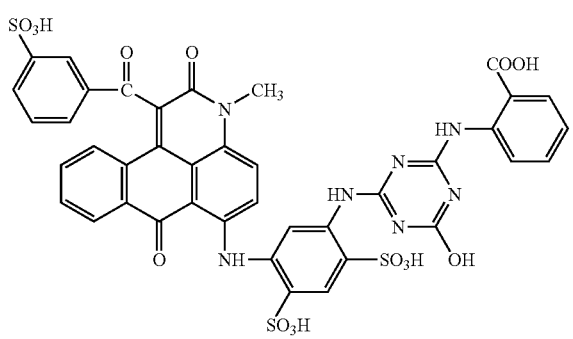

(13)

Example 5

(A) Preparation of an Ink

Each water-based magenta ink composition for ink-jetting was produced by preparing an ink composition containing each of the anthrapyridone compounds (dyestuff components) obtained in Examples 1 to 4, which has a composition of Table 2 shown below, followed by filtering through a 0.45 μm membrane filter. Ion exchanged water was used for the water. The water and ammonium hydroxide were added to adjust the ink composition to be 100 parts in total quantity and the pH at 8 to 10.

TABLE 2

| | |
|---|---|
| Dyestuff component obtained in Examples 1 to 4 | 5.0 parts |
| Water + Ammonium hydroxide | 75.9 parts |
| Glycerin | 5.0 parts |
| Urea | 5.0 parts |
| N-methyl-2-pyrrolidone | 4.0 parts |
| IPA (isopropylalcohol) | 3.0 parts |
| Butylcarbitol | 2.0 parts |
| Surfactant (Surfinol 104PG50, by Nissin Chemical Industry Co., Ltd.) | 0.1 parts |
| Total | 100.0 parts |

(B) Ink-Jet Printing

By using an inkjet-printer (Trade name: BJS-630, by Canon Inc.), ink-jet recordings were performed on four types of recording materials: Plain Paper, Professional Photo Paper (PR-101, by Canon Inc.), Photo Glossy Film (HG-201, by Canon Inc.) and PM Photo Paper <Glossy> (by Seiko-Epson Co., Ltd). (hereinafter, PR refers to Professional Photo Paper; HG refers to Photo Glossy Film; and PM refers to PM Photo Paper <Glossy>)

In printing, image patterns were prepared so that reflection concentration can be obtained in several step tones. In the following experiments, measurement was carried out using a tone part of a printed article before the test, which has reflection concentration D value nearest to 1.0.

(C) Evaluation of Recorded Image (1) Hue Evaluation

Hue and Vividness of Recorded Image: A recorded paper was subjected to color determination using the colorimeter (GRETAG MACBETH SPECTROEYE, by GRETAG Co.) to calculate $L^*, a^*, b^*$ values. Vividness was calculated by the formula: $C^*=((a^*)^2+(b^*)^2)^{1/2}$. Results are shown in Table 3.

(2) Light Fastness Test

Xenon Weather Meter (by Atlas Co., Ltd.) was used to irradiate on the recorded images at 24° C., 60% RH for 50 hrs. Color density (D value) was measured before and after the irradiation by the above color determination system to calculate residual rate by the following formula:

Residual rate (%)=(D value after the irradiation/D value before the irradiation)×100

The results are shown in Table 3.

(3) Ozone Gas Fastness Test

A piece of printed recording paper was placed in Ozone Weather Meter (an OMS-H model by Suga Test Instruments Co., Ltd) for testing and kept under the condition of 24%, 12 ppm and 60% RH for 2 hrs. Color density (D value) was measured before and after the test to calculate residual rate by the following formula:

Residual rate (%)=(D value after the treatment/D value before the treatment)×100

The results are shown in Table 3.

The test results of hue, vividness, light fastness and ozone gas fastness of the recorded images are listed in Table 3, wherein Evaluation Example 1 shows the results of the evaluation of the ink composition produced from the compound obtained in Example 1 and so as Evaluation Example 2 shows the results of the evaluation of the ink composition produced from the compound obtained in Example 2, Evaluation Example 3 shows the results of the evaluation of the ink composition produced from the compound obtained in Example 3 and Evaluation Example 4 shows the results of the evaluation of the ink composition produced from the compound obtained in Example 4. Further, Table 3 also includes Comparative Example 1 which shows the evaluation result by use of the anthrapyridone compound (the compound No. 4 described in the publication) described in Example 2 of JP Laid-Open No. 109464/2000.

TABLE 3

|  | Hue | | | Vividness | Light-fastness (residual | Ozone-fastness (residual |
|---|---|---|---|---|---|---|
|  | L* | a* | b* | C* | rate %) | rate %) |
| Evaluation Example 1 | | | | | | |
| Plain paper | 50.5 | 61.4 | −14.3 | 63.0 | 95 | 99 |
| PR | 58.2 | 71.7 | −27.1 | 76.7 | 88 | 92 |
| HG | 58.7 | 71.4 | −28.5 | 76.9 | 82 | 96 |
| PM | 59.1 | 71.5 | −31.3 | 78.1 | 93 | 95 |
| Evaluation Example 2 | | | | | | |
| Plain paper | 49.7 | 60.9 | −13.7 | 62.4 | 91 | 99 |
| PR | 57.9 | 70.7 | −27.3 | 75.8 | 88 | 92 |
| HG | 58.3 | 69.9 | −27.8 | 75.2 | 83 | 94 |
| PM | 59.0 | 70.6 | −30.9 | 77.1 | 92 | 94 |
| Evaluation Example 3 | | | | | | |
| Plain paper | 50.1 | 58.5 | −13.8 | 60.1 | 94 | 99 |
| PR | 56.5 | 72.4 | −25.8 | 76.9 | 85 | 94 |
| HG | 57.1 | 72.0 | −26.3 | 76.7 | 79 | 94 |
| PM | 57.8 | 73.3 | −29.5 | 79.0 | 91 | 95 |
| Evaluation Example 4 | | | | | | |
| Plain paper | 48.9 | 61.3 | −16.7 | 63.5 | 97 | 99 |
| PR | 59.0 | 72.4 | −31.1 | 78.8 | 93 | 95 |
| HG | 59.3 | 72.4 | −32.1 | 79.2 | 90 | 96 |
| PM | 59.5 | 70.9 | −33.2 | 78.3 | 96 | 97 |
| Comparative Example 1 | | | | | | |
| Plain paper | 52.6 | 57.6 | −0.6 | 57.6 | 96 | 99 |
| PR | 59.0 | 69.2 | −14.0 | 70.6 | 85 | 51 |
| HG | 58.8 | 68.9 | −15.8 | 70.7 | 83 | 61 |
| PM | 60.6 | 68.1 | −14.8 | 69.7 | 89 | 65 |

C* values in Evaluation Examples 1 to 4 are higher than that in Comparative Example 1, thus proving higher vividness. Also residual rates in ozone gas fastness in Evaluation Examples 1 to 4 are higher than that in Comparative Example 1, thus proving significantly improved image stability against ozone gas, and the like. Further, the residual rates in light fastness in Evaluation Examples 1 to 4 are also high, thus showing that the anthrapyridone compound of the present invention is an excellent compound as magenta dyestuff for ink jetting.

The anthrapyridone compound of the present invention is generally superior to the compound of Comparative Examples and exhibits stable and high quality in each medium (recording material). Further, dyestuffs obtained in Examples 1 to 4, having water-solubility of 100 g/l or more under an alkaline condition (pH 8 to 9), each can be used easily as they have wide range of applications such that a stable ink or a high concentration ink can be prepared as ink-jet dyestuff by using them.

Example 6

(1) To the reaction solution containing the compound of the formula (4) ($R_1$=$CH_3$) obtained as in (1) to (4) of Example 1 was added an aqueous solution consisting of 9.2 parts of 5-amino-isophthalic acid (purity of 94.8%), 15.3 parts of 25% aqueous solution of sodium hydroxide and 60 parts of water, and the second condensation reaction was carried out at 60 to 70° C. for 1 hour while adjusting the PH at 6 to 7 by dropping 25% aqueous sodium hydroxide solution, to obtain the reaction solution containing the compound of No. 35 in Table 1 (the compound of the formula (1) wherein $R_1$=$CH_3$, X=3,5-dicarboxyanilino group and Y=Cl).

(2) While adjusting the pH at 11 by addition of 25% aqueous sodium hydroxide solution to the reaction solution obtained in the above (1), reaction was carried out at 85 to 90° C. for 1 hour. After the reaction, water was added to adjust the reaction solution to 500 parts and insoluble matter was removed by filtration. Water was added to adjust the reaction solution to 600 parts and into which 90 parts of sodium chloride was added while maintaining at 60 to 65%, then HCl was added to adjust the pH at 1.5, followed by stirring for 15 minutes. Crystal obtained was filtered and washed with 150 parts of 20% aqueous solution of sodium chloride to obtain the compound of No. 35 in Table 1 (the compound of the formula (1) wherein $R_1$=$CH_3$, X=3,5-dicarboxyanilino group and Y=OH) as a red wet cake.

(3) The wet cake obtained in the above (2) was added in 800 parts of methanol, followed by heating to 60 to 65° C., stirring, filtering, washing with methanol and drying to obtain 30.1 parts of the compound as red crystal.

λ max:535.0 nm (in water)

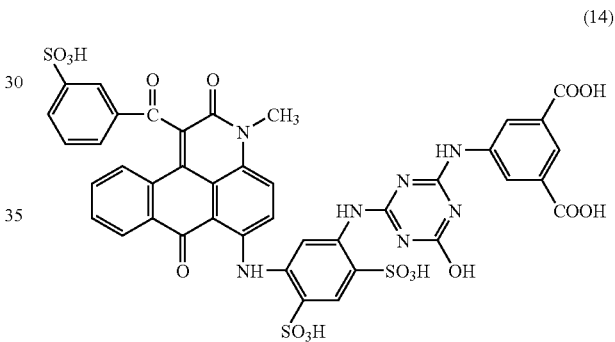

(14)

Example 7

(1) To the reaction solution containing the compound of the formula (4) ($R_1$=$CH_3$) obtained as in (1) to (4) of Example 1 was added an aqueous solution consisting of 6.5 parts of p-aminobenzoic acid, 8 parts of 25% aqueous solution of sodium hydroxide and 40 parts of water, and the reaction was carried out at 55 to 60' for 1 hour while adjusting the pH at 6.0 to 6.5 by dropping 25% aqueous sodium hydroxide solution, to obtain the reaction solution containing the compound of No. 36 in Table 1 (the compound of the formula (1) wherein $R_1$=$CH_3$, X=4-carboxyanilino group and Y=Cl).

(2) While adjusting the pH at 11 to 11.5 by addition of 25% aqueous sodium hydroxide solution to the reaction solution obtained in the above (1), reaction was carried out at 90° C. for 1 hour. After the reaction, insoluble matter was removed by filtration. Water was added to adjust the reaction solution to 500 parts and into which 75 parts of sodium chloride was added while maintaining at 40 to 50%, then HCl was added to adjust the pH at 0.5, followed by stirring for 30 minutes. Crystal obtained was filtered and washed with 150 parts of 20% aqueous solution of sodium chloride to obtain the compound of No. 29 in Table 1 (formula (1) wherein $R_1$=$CH_3$, X=4-carboxyanilino group and Y=OH) (a compound of the following formula (15)) as a red wet cake.

(3) The wet cake obtained in the above (2) was added in 500 parts of methanol, followed by heating to 60 to 65° C., stirring, filtering, washing with methanol and drying to obtain 35.1 parts of the compound as red crystal.

λ max:532.0 nm (in water)

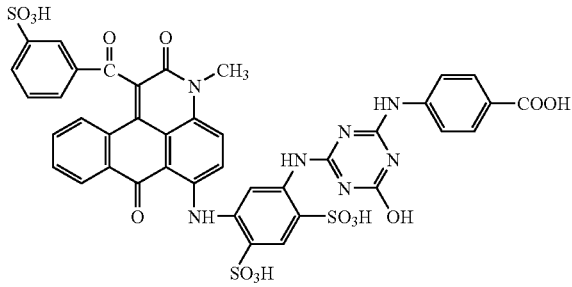

(15)

Example 8

(1) Similarly as in Example 6 (1) except that 6.5 parts of m-aminobenzoic acid was used instead of 6.5 parts of p-aminobenzoic acid in Example 6 (1), the reaction solution containing the compound of No. 37 in Table 1 (the compound of the formula (1) wherein $R_1$=$CH_3$, X=3-carboxyanilino group and Y=Cl) was obtained.

(2) While adjusting the pH at 11 to 11.2 by addition of 25% aqueous sodium hydroxide solution to the reaction solution obtained in the above (1), reaction was carried out at 90° C. for 1 hour. After the reaction, insoluble matter was removed by filtration. Water was added to adjust the reaction solution to 800 parts and into which 120 parts of sodium chloride was added while maintaining at 50 to 60%, then HCl was added to adjust the pH at 1.5, followed by stirring for 30 minutes. Crystal obtained was filtered and washed with 150 parts of 20% aqueous solution of sodium chloride to obtain the compound of No. 28 in Table 1 (the compound of the formula (1) wherein $R_1$=$CH_3$, X=3-carboxyanilino group and Y=OH) (the compound of the following formula (16)) as a red wet cake.

(3) The wet cake obtained in the above (2) was added in 400 parts of methanol, followed by heating to 60 to 65° C., stirring, filtering, washing with methanol and drying to obtain 34.9 parts of the compound as red crystal.

λ max:537.0 nm (in water)

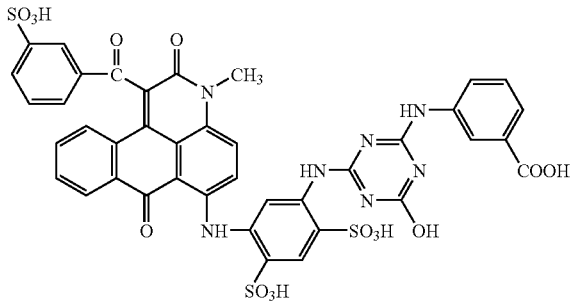

(16)

Example 9

Similarly as in (A) to (C) of Example 5, ink was prepared and ink-jet print recording was carried out to evaluate image performance. As a print paper in this test, however, Super Photo Paper (SP-101 manufactured by Canon Inc.; abbreviated as "SP" in the Table) was used instead of PM Photo Paper (Glossy) (manufactured by Seiko-Epson Co., Ltd.).

Test results on hue, vividness, light fastness and ozone gas fastness are shown in Table 4. Evaluation Example 5 shows the results of the evaluation of the ink composition produced from the compound obtained in Example 6 and so as Evaluation Example 6 shows the results of the evaluation of the ink composition produced from the compound obtained in Example 7, and Evaluation Example 7 shows the results of the evaluation of the ink composition produced from the compound obtained in Example 8.

TABLE 4

| | Hue | | | Vividness | Light-fastness (residual | Ozone-fastness (residual |
|---|---|---|---|---|---|---|
| | L* | a* | b* | C* | rate %) | rate %) |
| Evaluation Example 5 | | | | | | |
| Plain paper | 45.8 | 56.0 | −18.6 | 59.3 | 96 | 99 |
| PR | 54.1 | 70.8 | −30.7 | 77.2 | 93 | 99 |
| SP | 54.3 | 70.6 | −31.07 | 77.1 | 94 | 98 |
| HG | 55.0 | 71.0 | −31.4 | 77.6 | 84 | 97 |
| Evaluation Example 6 | | | | | | |
| Plain paper | 49.9 | 55.6 | −15.5 | 57.7 | 96 | 99 |
| PR | 56.7 | 69.0 | −26.4 | 73.9 | 84 | 96 |
| SP | 56.4 | 69.0 | −29.0 | 74.8 | 90 | 96 |
| HG | 56.8 | 68.8 | −29.3 | 74.8 | 80 | 96 |
| Evaluation Example 7 | | | | | | |
| Plain paper | 47.0 | 58.1 | −17.7 | 60.7 | 98 | 99 |
| PR | 57.2 | 67.7 | 29.0 | 73.6 | 93 | 97 |
| SP | 56.9 | 68.0 | −28.4 | 73.7 | 93 | 95 |
| HG | 57.8 | 67.3 | −29.9 | 73.6 | 85 | 97 |

INDUSTRIAL APPLICABILITY

The new anthrapyridone compound of the present invention is excellent in water-solubility, stable in storing an aqueous solution thereof and characterized by having good filtration ability through a membrane filter in the production process of an ink composition. The compound is highly safe for a living body. Furthermore, the ink composition of the present invention using the new anthrapyridone compound does not show crystal deposition after a long period of storage, changes in property and color, so that it has good storage stability. The ink composition of the present invention, when used as a magenta ink for ink-jet recording, can provide a printed matter with excellent grade in light fastness, ozone gas fastness and moisture fastness and makes excellent ink-jet recording possible. The composition also can provide a vivid printed surface as well as an ideal magenta color. The composition, when used together with a yellow or cyan ink, can provide a wide visible ray range of color tone. Therefore, the ink composition of the present invention is extremely useful as a magenta ink for ink-jet recording.

The invention claimed is:
1. An anthrapyridone compound represented by the following formula (1):

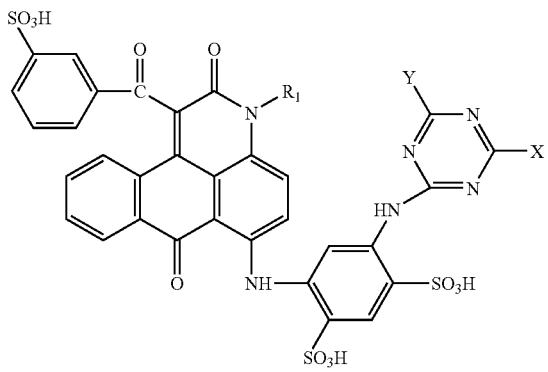

(1)

wherein $R_1$ represents a hydrogen atom, an alkyl group, a hydroxy lower alkyl group, a cyclohexyl group, mono- or dialkylaminoalkyl group or a cyano lower alkyl group;

Y represents a chlorine atom, a hydroxyl group, an amino group, mono- or dialkylamino group optionally substituted with a substituent selected from the group consisting of a sulfonic acid group, a carboxyl group and a hydroxyl group on an alkyl group, or a morpholino group;

X represents the following formula (2):

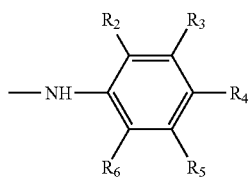

(2)

wherein $R_2$, $R_3$, $R_4$, $R_5$ and $R_6$ each independently represent a hydrogen atom, a $C_{1-8}$ alkyl group or a carboxyl group, provided that such a case is excluded that all of $R_2$, $R_3$, $R_4$, $R_5$ and $R_6$ are hydrogen atoms or the salt thereof.

2. The anthrapyridone compound or the salt thereof according to claim 1, wherein $R_1$ in the formula (1) is a methyl group.

3. The anthrapyridone compound or the salt thereof according to claim 1, wherein Y in the formula (1) is a hydroxyl group or an amino group.

4. The anthrapyridone compound or the salt thereof according to claim 1, wherein $R_1$ in the formula (1) is a methyl group and Y is a hydroxyl group or an amino group.

5. The anthrapyridone compound or the salt thereof according to claim 1, wherein one of or both of $R_2$ and $R_6$ among $R_2$ to $R_6$ are independently a group selected from the group consisting of a methyl group, an ethyl group, a n-propyl group, an iso-propyl group and a carboxyl group, and the remaining groups are hydrogen atoms.

6. The anthrapyridone compound or the salt thereof according to claim 1, wherein 1 to 3 groups among $R_2$ to $R_6$ are carboxyl groups.

7. The anthrapyridone compound or the salt thereof according to claim 1, wherein at least one of $R_2$, $R_3$ or $R_5$ is a carboxyl group and the remaining groups are hydrogen atoms.

8. The anthrapyridone compound or the salt thereof according to claim 2, wherein 1 to 3 groups among $R_2$ to $R_6$ are carboxyl groups.

9. The anthrapyridone compound or the salt thereof according to claim 4, wherein 1 to 3 groups among $R_2$ to $R_6$ are carboxyl groups.

10. The anthrapyridone compound or the salt thereof according to any one of claims 1 to 9, wherein Y in the formula (1) is a hydroxyl group.

11. The anthrapyridone compound or the salt thereof according to claim 1, wherein $R_1$ is a methyl group, Y is a hydroxyl group, 1 or 2 of $R_2$, $R_3$ or $R_5$ among $R_2$ to $R_6$ are carboxyl groups and the remaining groups are hydrogen atoms.

12. A water-based magenta ink composition comprising an anthrapyridone compound or the salt thereof according to any one of claims 1 to 11 as dyestuff.

13. The water-based magenta ink composition according to claim 12, wherein the composition contains a water-soluble organic solvent.

14. The water-based magenta ink composition according to claim 12, wherein the content of an inorganic salt in the anthrapyridone compound or the salt thereof is 1% by weight or less.

15. The water-based magenta ink composition according to claim 14, wherein the composition contains a water-soluble organic solvent.

16. The water-based magenta ink composition according to claim 12, which is prepared for ink-jet recording.

17. The water-based magenta ink composition according to claim 15, which is prepared for ink-jet recording.

18. A method for ink-jet recording, wherein ink droplets are ejected responding to the record signals to record onto a recording material, wherein the ink comprises the water-based magenta ink composition according to claim 12.

19. A method for ink-jet recording, wherein ink droplets are ejected responding to the record signals to record onto a recording material, wherein the ink comprises the water-based magenta ink composition according to claim 15.

20. The method for ink-jet recording according to claim 18 or claim 19, wherein the recording material is an information transmission sheet.

21. A container containing the water-based magenta ink composition according to claim 12.

22. An ink-jet printer having the container according to claim 21.

23. A colored article comprising the anthrapyridone compound or the salt thereof according to any one of claims 1 to 11.

* * * * *